United States Patent [19]

Fukuoka

[11] Patent Number: 5,556,161
[45] Date of Patent: * Sep. 17, 1996

[54] APPARATUS FOR VIBRATING SEATS

[75] Inventor: Masahiro Fukuoka, Aichi, Japan

[73] Assignee: Fukuoka Kagaku Ltd., Nishikamo-gun, Japan

[*] Notice: The term of this patent shall not extend beyond the expiration date of Pat. No. 5,348,370.

[21] Appl. No.: 358,244

[22] Filed: Dec. 19, 1994

Related U.S. Application Data

[60] Division of Ser. No. 194,356, Feb. 10, 1994, which is a continuation-in-part of Ser. No. 987,481, Dec. 4, 1992, Pat. No. 5,348,370.

[51] Int. Cl.$^6$ .................................................. A47C 31/00
[52] U.S. Cl. ........................................ 297/217.3; 297/217.1
[58] Field of Search ............................ 297/217.1, 217.3, 297/258, 260, 272, 311, 313, 325, 330, 344.1, 344.11, 463.1, 217.7, 463.2

[56] References Cited

U.S. PATENT DOCUMENTS 3,455,296  7/1969  McCaleb.

FOREIGN PATENT DOCUMENTS

| 3-67727 | 3/1991 | Japan. |
| 3-136927 | 6/1991 | Japan. |
| 3-204343 | 9/1991 | Japan. |
| 4-9141 | 1/1992 | Japan. |
| 4-66335 | 3/1992 | Japan. |
| 4-159122 | 6/1992 | Japan. |

*Primary Examiner*—Milton Nelson, Jr.
*Attorney, Agent, or Firm*—Armstrong, Westerman, Hattori, McLeland & Naughton

[57] ABSTRACT

A driver's seat having a vibration generator connected to the driver's seat and controls for turning the vibration generator on and off for vibrating the driver's seat so that when a driver feels drowsiness coming on, the driver can operate the controls for switching on-off the vibration generator so that the driver's seat can be vibrated and prevent the driver from dozing during driving and prevent an accident from occurring.

1 Claim, 18 Drawing Sheets

APPARATUS FOR VIBRATING SEATS

This application is a Divisional of application Ser. No. 08/194,356 filed Feb. 10, 1994, which is a continuation-in-part of application Ser. No. 07/987,481, filed Dec. 4, 1992, now U.S. Pat. No. 5,348,370.

BACKGROUND OF THE INVENTION

1. Field of the Invention

This invention relates to an apparatus used for vibrating a driver's seat of automobiles, or the like in order to keep a driver alert and to prevent a driver from dozing during driving.

2. Description of the Relevant Art

A variety of apparatus have been proposed to keep a driver alert and to prevent a driver of automobiles or the like, from dozing during driving. Such apparatuses usually comprise a sensor for sensing that a driver has started to doze and means for alerting or waking up a driver by receiving a signal from a sensor. For example, there is a sensor which senses that a driver has started to doze by sensing the number of times the driver nods per unit time or the time for leaning one's head forward, and the like, because a driver nods when the driver starts to doze, and sends a signal to means for alerting the driver. Also, there are means for alerting a driver which operates by receiving the signal, and alerting the driver by producing a loud sound in the driver's ear or ears. Therefore, according to this apparatus, if a driver starts to doze, the sensor senses that the driver's head is leaning forward, and actuates the means for alerting or waking up the driver.

However, because the above-mentioned apparatus operates only after a driver has started to doze off, the driver may lose concentration, due to drowsiness, when the driver has started to doze, to such a degree that the means for alerting and waking up the driver may not be effective.

Accordingly, the objective of this invention is to provide apparatus for preventing a driver from dozing off by vibrating the seat.

SUMMARY OF THE INVENTION

In order to accomplish the above objective, the apparatus of this invention for vibrating seats comprises a driver's seat and means for vibrating such driver's seat and means for controlling the vibration of such means for vibrating the driver's seat.

As a result of a series of studies of apparatus to effectively prevent dozing during driving, the inventors have discovered that it is too late to prevent accidents when a driver is awaken by a sensor that senses a driver has started to doze. The inventor has discovered that, if a driver's seat is always being vibrated, the driver remains alert, cannot doze off and, as a result, traffic accidents caused by dozing during driving can be completely prevented.

BRIEF DESCRIPTION OF THE DRAWINGS

The invention will be more fully described and will be better understood from the following descriptions, taken with the appended drawings, in which.

DETAILED DESCRIPTION OF THE PREFERRED EMBODIMENTS

The following are detailed descriptions of the various embodiments.

Figure 1:
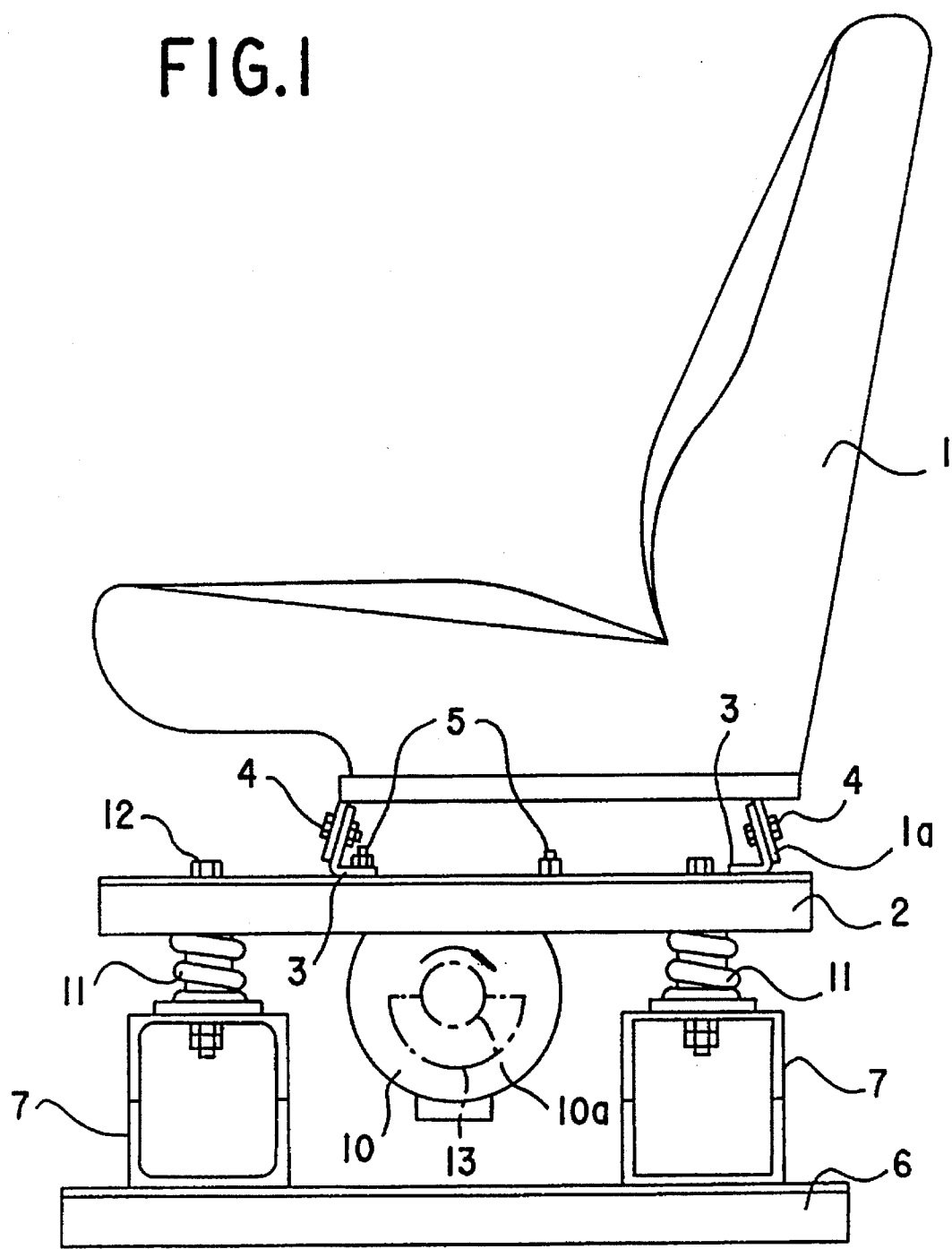
FIG. 1 is a side view of one embodiment of the present invention.
Figure 2:
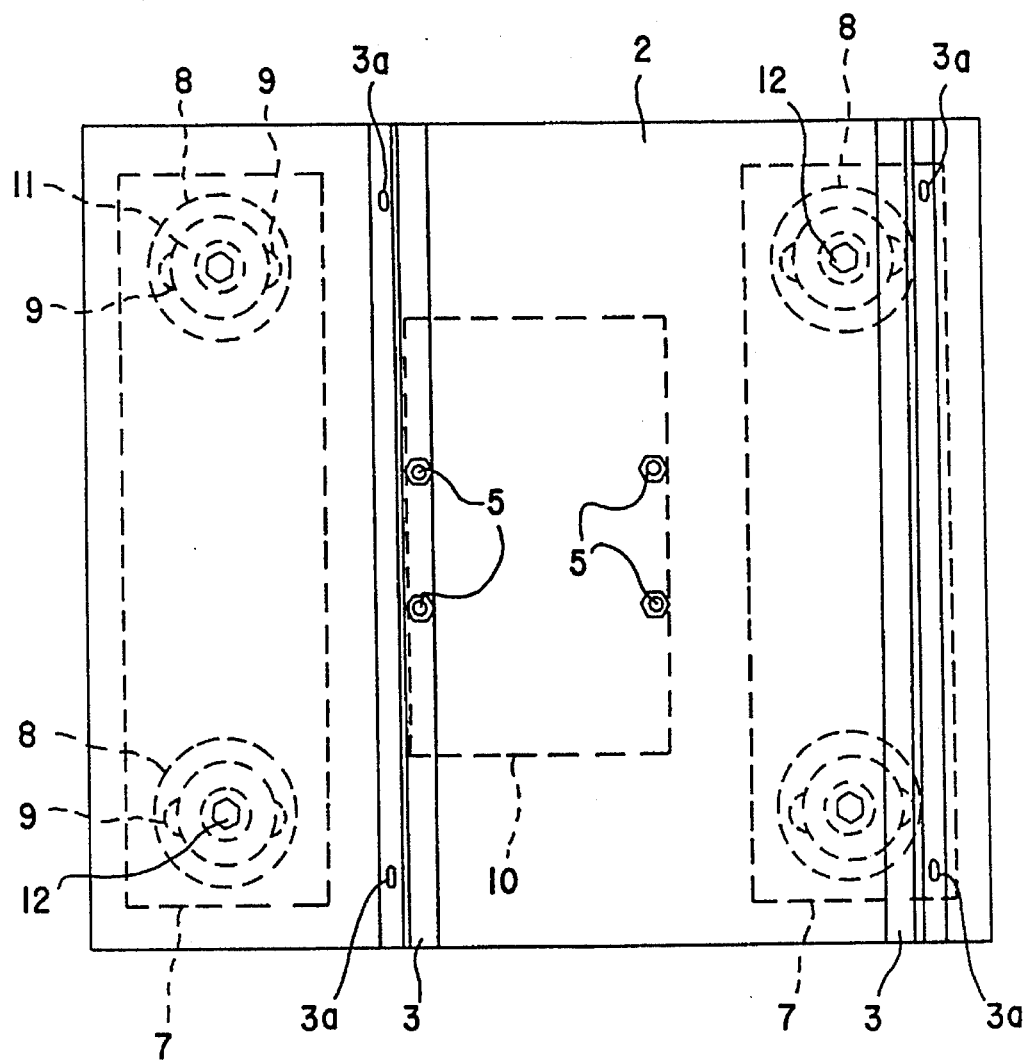
FIG. 2 is a top plan view of the apparatus of FIG. 1 with the driver's seat removed.

FIG. 1 shows a side view of the first embodiment of the invention having a structure for vibrating a driver's seat 1 by a motor 10 installed on the underside of the driver's seat whereby the vibration is transmitted to the driver's seat 1 the vibration motor 10 is activated. Driver's seat 1 is mounted on base 2 and, as best shown in FIG. 2, is attached to base 2 by angle fasteners 3 shaped like an L, and which face each other, at a position toward the front and a rear end of base 2. Stationary plates 1a, are fixed, by bolts 4, on the radial outward slants of said angle fasteners 3 at the front end and the rear end of the base of seat 1. The other side of angle fasteners 3 are welded on the upper side of base 2. Vibration motor 10 is fixed with bolts 5 on the underside of base 2. Output shaft 10a of vibration motor 10 extends in a horizontal direction, as viewed from the front of the driver's seat 1 and from the front of automobile 15 shown in FIG. 3. As shown in FIG. 4, eccentric loads 13, comprising fixed load 13a and an adjustable load 13b, are installed on opposite ends 10b of output shaft 10a, the direction of rotation being indicated by an arrow in FIG. 1 of vibration motor 10. The centrifugal force caused by eccentric loads 13, rotating at the opposite ends of output shaft 10*a*, causes base 2, and seat 1 mounted thereon, to vibrate. In FIG. 4, 10*c* is a stator core and 10*d* is a rotor core of vibration motor 10 which is an electric motor.

Figure 5:
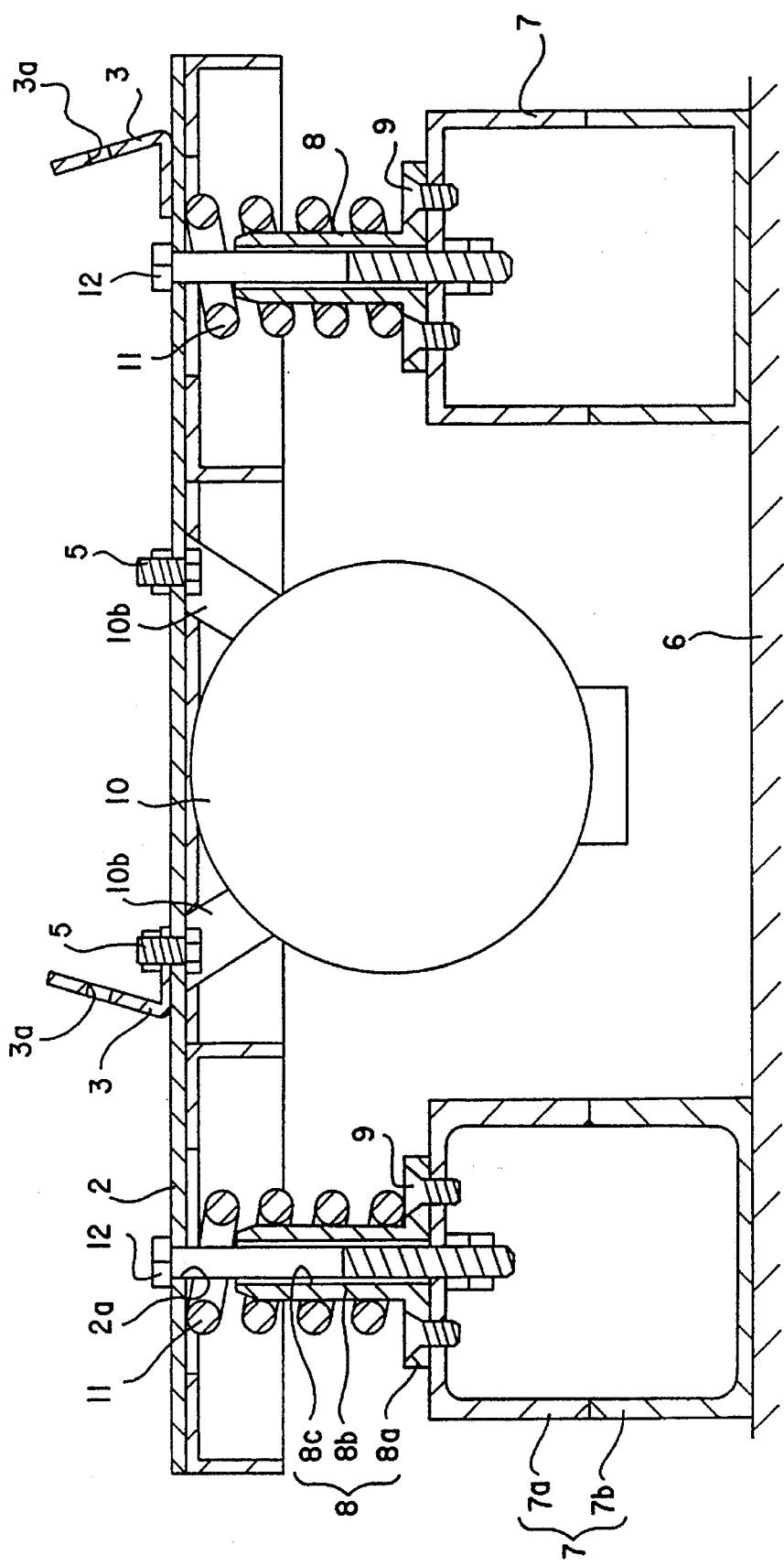
FIG. 5 is an enlarged view, partly in section, of the apparatus of FIG. 1.

Base 2, with supporting seat 1 thereon is elastically supported by its corner, FIG. 2, on bed 6. Bed 6 is fixed on the floor 16 of an automobile 15, FIG. 3. Hollow rectangular barrel frames 7 (shown in FIGS. 1 and 2), having frame bodies 7*a* and 7*b* (see, FIG. 5), are welded together on the front and rear on the upperside of bed 6. Spring supports 8 are installed on the right and left (see, FIGS. 1 and 5), front and rear (see, FIG. 2) of the upperside portion of rectangular barrel frames 7. Each of the springs supports 8 includes a disc type bottom parts 8*a*, support parts 8*b* installed on the middle of the upperside of disc type bottom parts 8*a*, and passenger 8*c* penetrating both bottom parts 8*a* and support parts 8*b*. Bottom parts 8*a* are fixed on the upperside of rectangular barrels 7 with screws 9. Support parts 8*b* are engaged, from the outside, with springs 11. Bolts 12 are inserted through each passage 8*c*. Each bolt 12 is inserted from the upperside into each bolt hole 2*a*, on base seat 2. The nut screw part of each bolt 12 is fixed by, for example, welding on the ceiling of each rectangular barrel 7. Thus, the underside of the base 2 for installation of seat 1 is elastically suspended on the upper end of springs 11.

Figure 3:
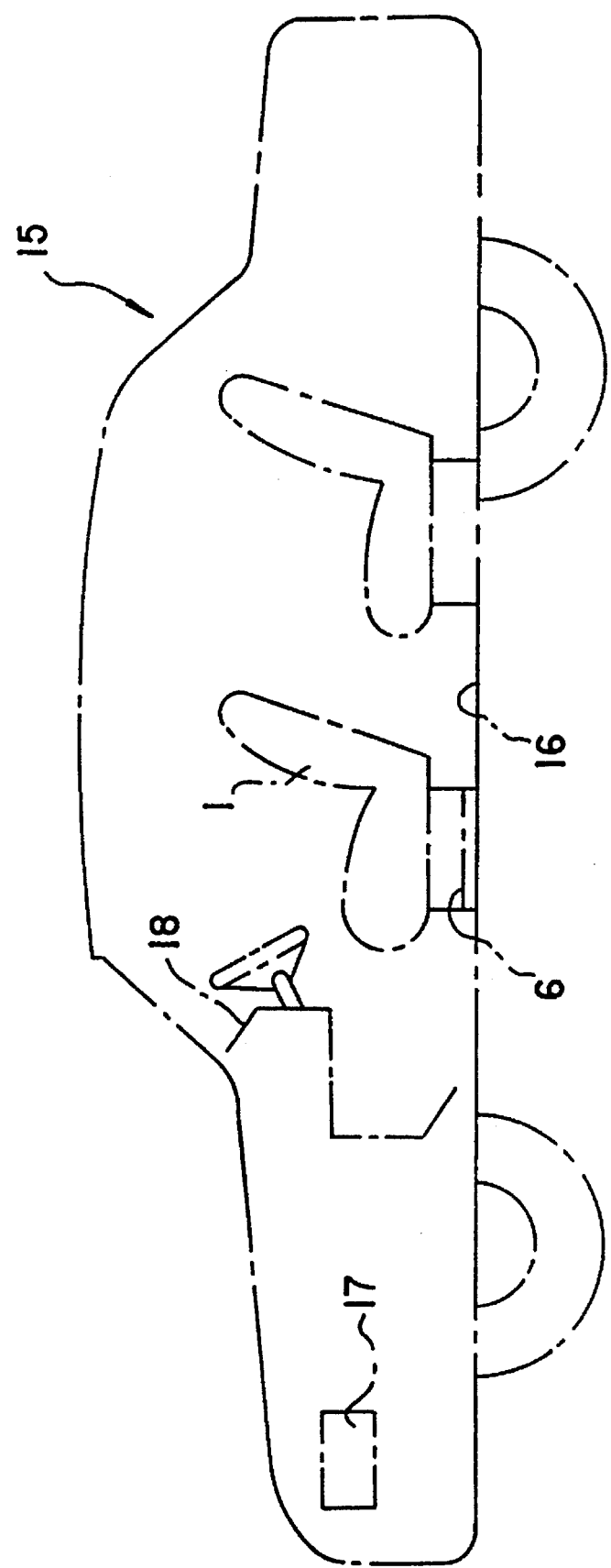
FIG. 3 is a side schematic view of an automobile incorporating the invention of FIG. 1.
Figure 4:
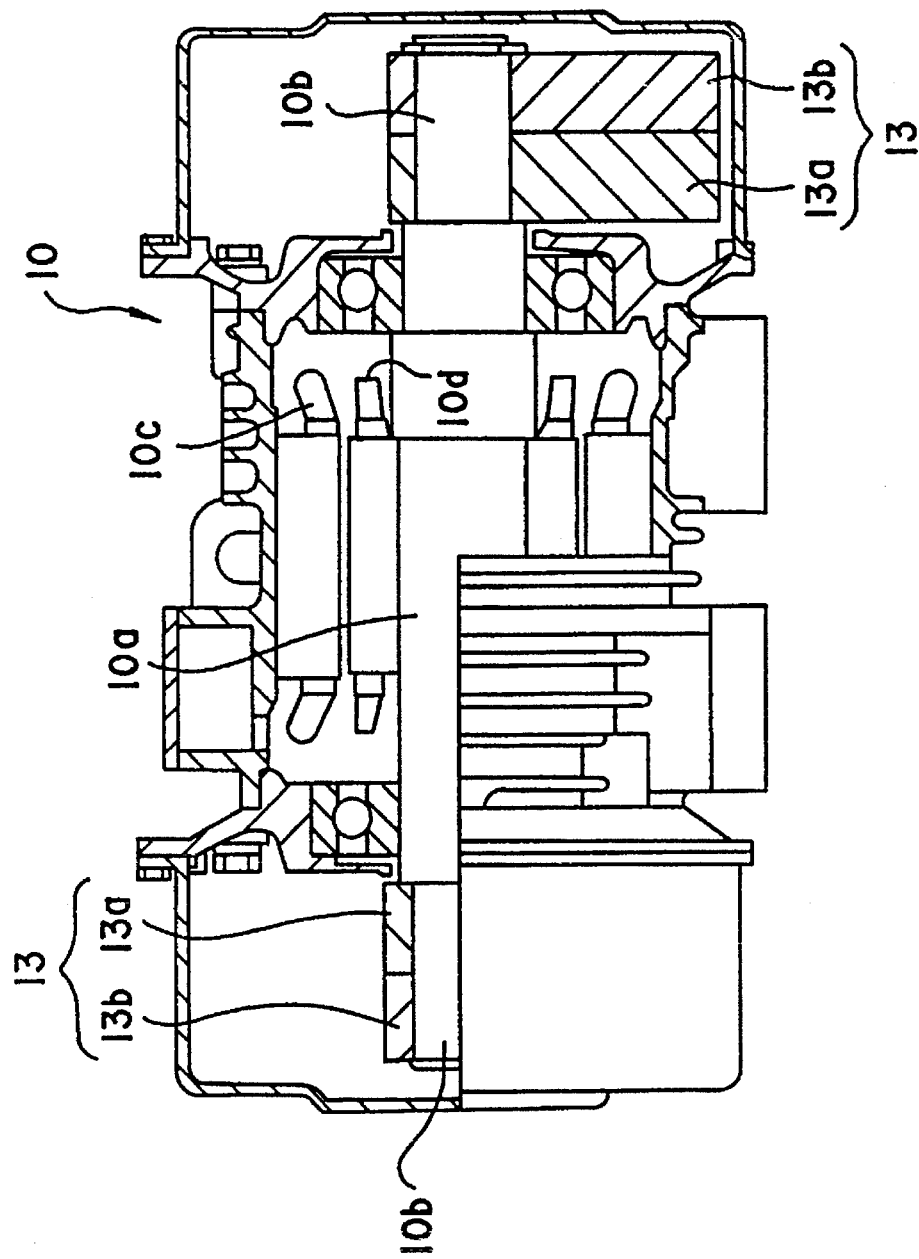
FIG. 4 is a vertical sectional view of the vibrator of this embodiment.
Figure 6:
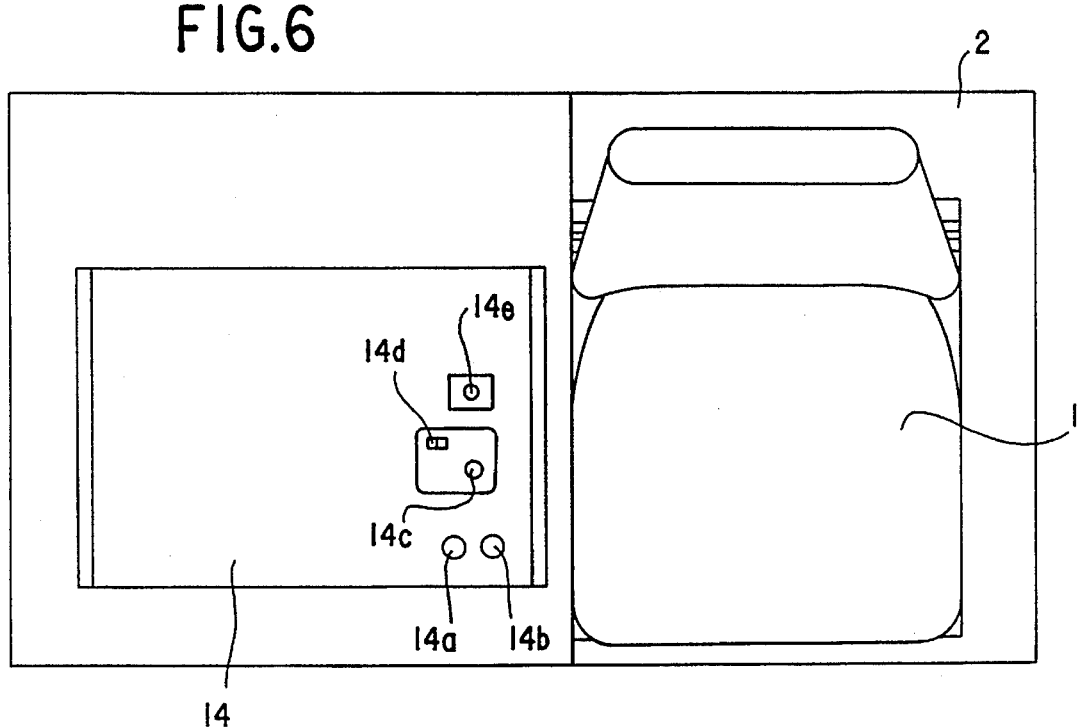
FIG. 6 is a top view of the driver's seat and the control panel for control of the apparatus of FIG. 1.
Figure 7:
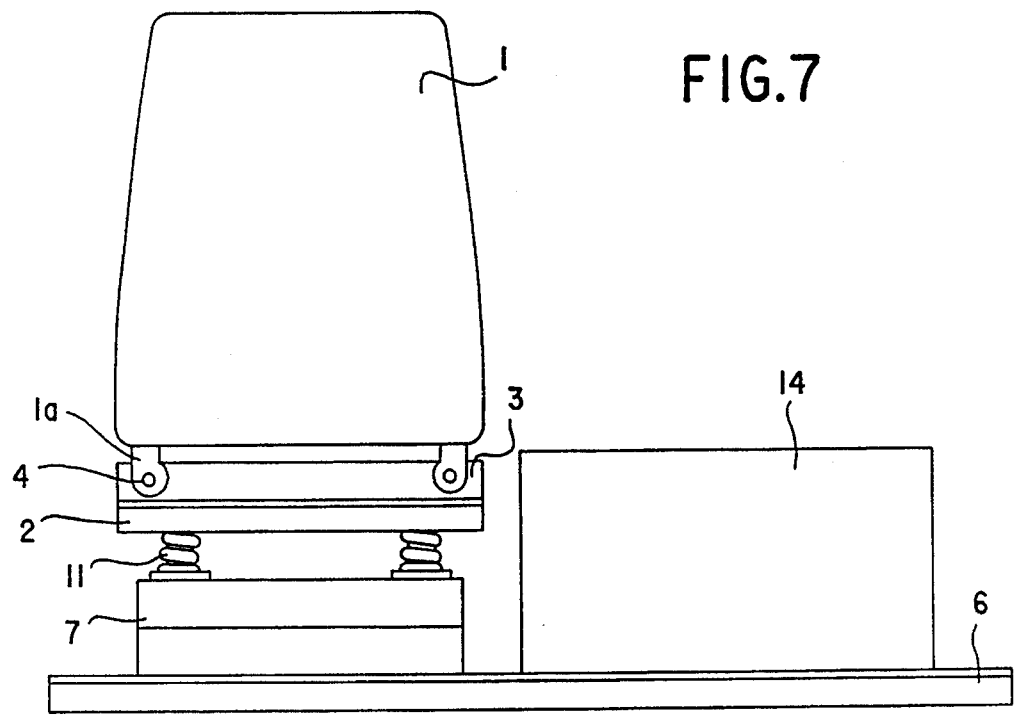
FIG. 7 is a rear view of the apparatus of FIG. 6.

In an automobile 15 shown in FIG. 3, a controller console panel 14 is set up on the right side, facing forward, of the driver's seat 1 as shown in FIGS. 6 and 7. Arranged on the console panel 14 are power-on switch 14*a*, power-off switch 14*b*, operation switch 14*c*, and frequency handle 14*d* for enabling the speed and the number of vibration frequency of vibration motor 10 to be varied and set at a desired frequency. Further arranged on the console panel is a timer 14*e* for setting a timer for start-up and stopping of vibration motor 10 and seat vibration caused thereby. Controller console panel 14 also contains an inverter (not shown) so that an electric current from a battery 17 installed in the front part of an automobile 15 is converted into alternating current for supply to the vibration motor 10. In this first embodiment, the apparatus can provide the driver's seat, having a maximum unload of 100 kgs., with 20 Hz in the number of vibration frequency and 15 mm of the amplitude of the vibration for vibrating the driver's seat 1 up-down and back-forth.

When the driver feels drowsiness coming on, the driver can turn on power-on-switch 14*a* and then turn on operation-switch 14*c* so that vibration motor 10 operates during a period set up with timer 14*e*, generates vibration and such vibration is transmitted through base 2 to driver's seat 1 through fasteners 3 and stationary plate 1*a* to driver's seat 1 and driver's seat 1 vibrates on springs 11. The vibrating driver seat 1 with the above-described structural arrangement and operation, keeps the driver alert and wards off dozing of the driver during driving.

Figure 8:
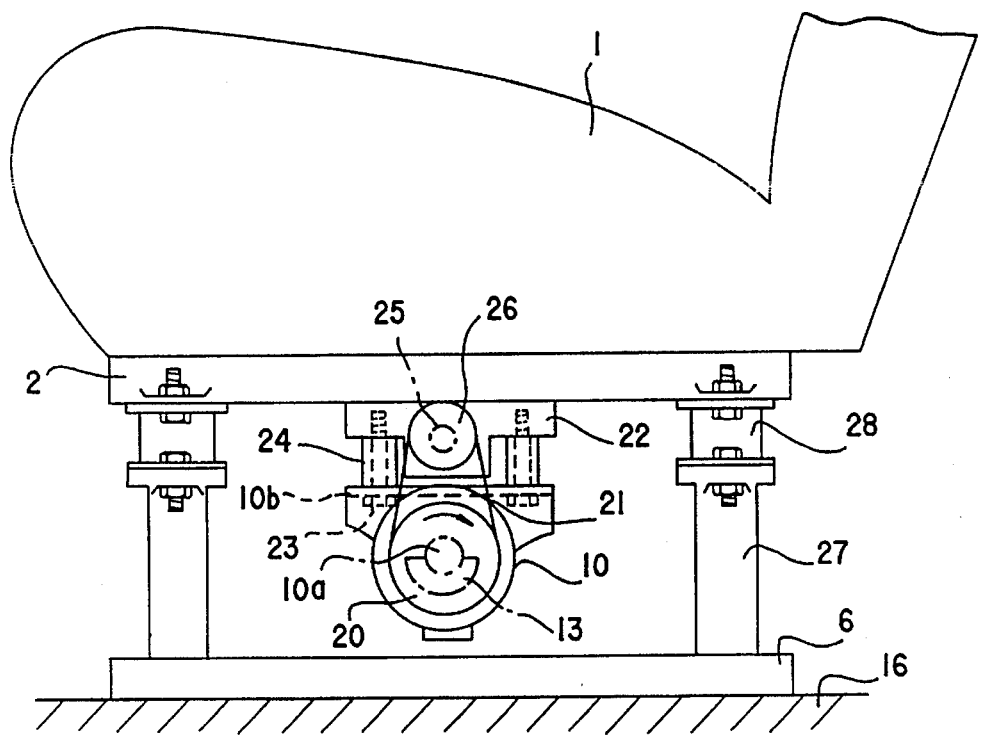
FIG. 8 is a side view, similar to FIG. 1, but showing another embodiment of the invention.
Figure 9:
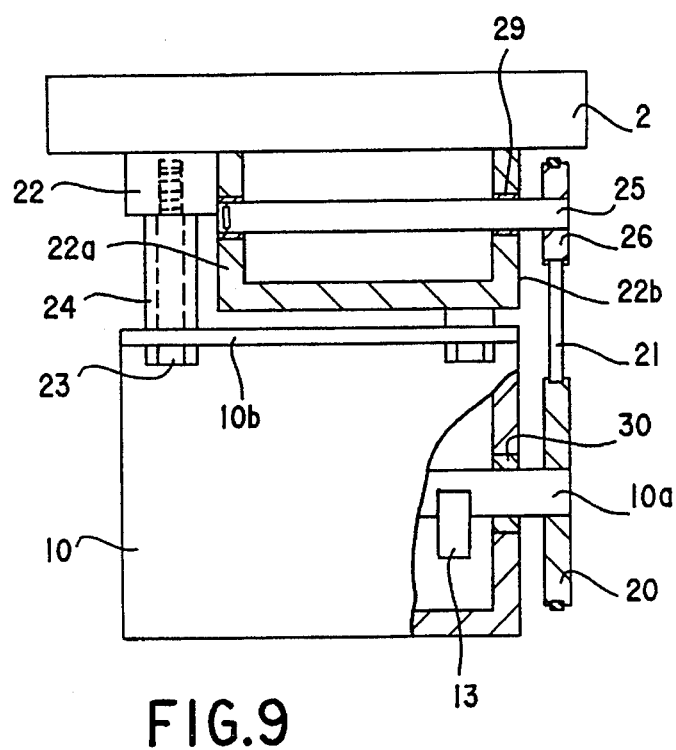
FIG. 9 is a front view, partly in section, of the vibrator arrangement of the embodiment of FIG. 8.

In FIGS. 8 and 9, a modification of the embodiment of FIGS. 1–7 is shown and will now be described. In this second embodiment, a pulley base 22 is set up on the underside of the base 2. Vibration motor 10 is fixed by bolts 23, on the underside of the pulley base 22. Rubber vibration insulators 24, covering bolts 23 are fixed between the upperside of support 10*b* of vibration motor 10 and the underside of pulley base 22. Power transmission shaft 25, on which pulley 26 is mounted, is installed horizontally between left wall 22*a* and right wall 22*b* of pulley base 22, under driver's seat 1, and is connected by belt 21 to pulley 20 mounted on output shaft 10*a* of vibration motor 10.

Support parts 27, as shown in FIG. 8, are provided on the bed 6, whereby the driver's seat is elastically suspended through rubber vibration insulators 28. Parts, except for those described above, are the same as those in the first embodiment and the same numbering is adopted. In FIG. 9, 29 and 30 are bearings.

According to this second embodiment, vibration generated by vibration motor 10 is transmitted mainly through lower pulley 20 and belt 21 to the upper pulley 26, and further from upper pulley 26 through power transmission shaft 25 to the base 2 for the driver's seat 1, and so on.

Rubber vibration insulators 24 on the pulley base 22, vibration motor 10, reduce troubles caused by vibration.

Figure 10:
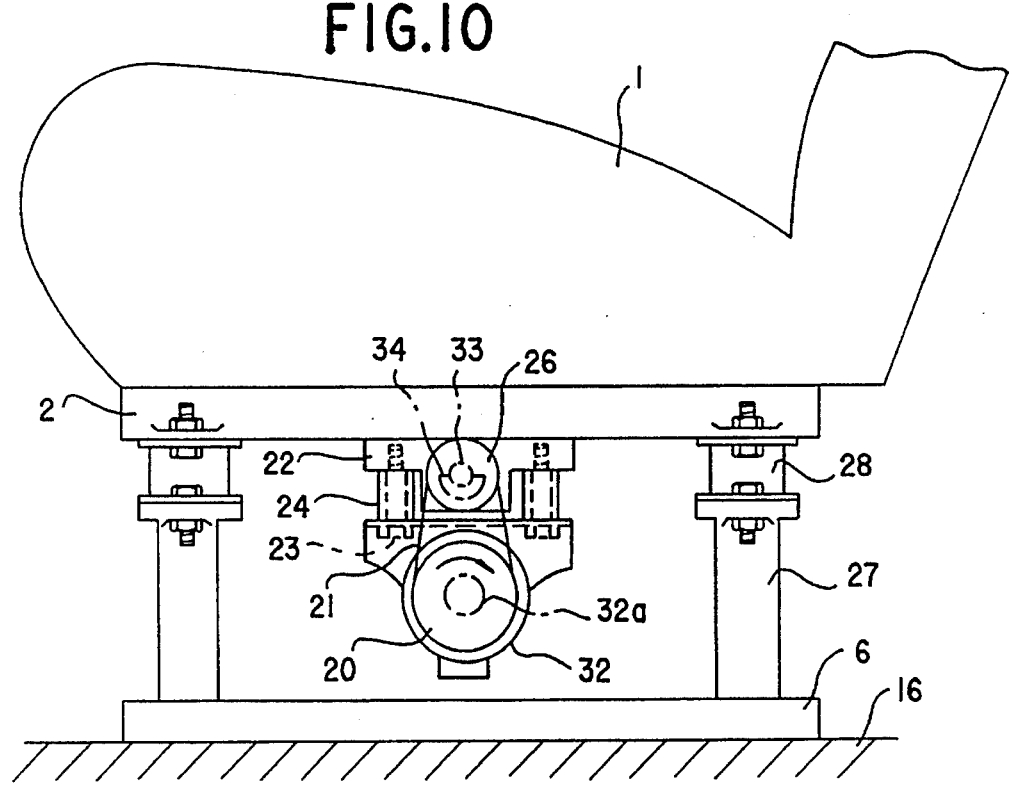
FIG. 10 is a side view, similar to FIG. 8, but showing a still further embodiment of the invention.
Figure 11:
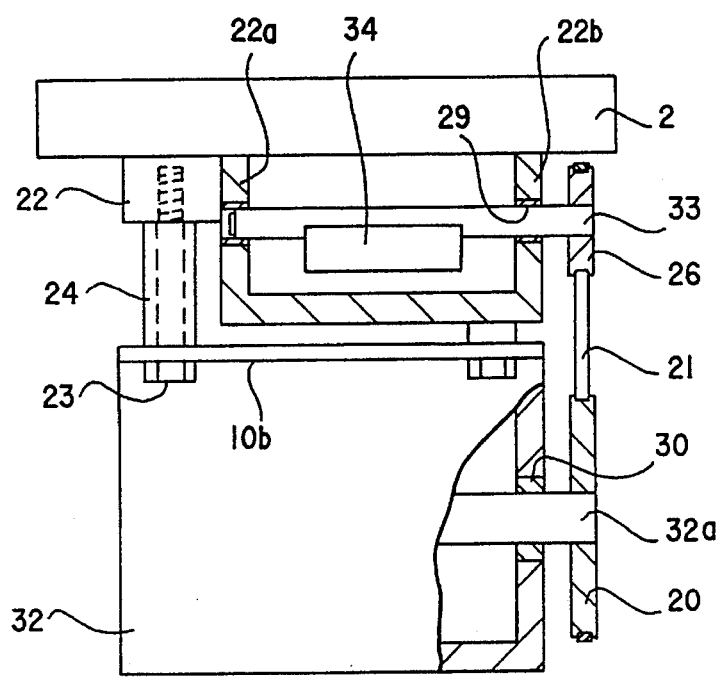
FIG. 11 is a front view, partly in section of the embodiment of FIG. 10.

FIGS. 10 and 11 show a third embodiment of the invention similar to the first and second embodiments. In such third embodiment, a motor 32 is installed on the underside of receiving the pulley base 22 and an eccentric load 34 is fixed on power transmission shaft 33 supported for rotation on walls 22*a* (left) and 22*b* (right) of pulley base 22. The other parts in the embodiment are the same reference as those of the second embodiment and the same numbering is adopted.

According to this third embodiment, when the rotation of the motor 32 is transmitted through output shaft 32*a* of motor 32, pulley 20 and belt 21 to pulley 26 and power transmission 33, eccentric load 34 on power transmission 33 vibrates and such vibration is transmitted to base 2 of driver's seat 1. In this third embodiment, motor 32, itself, does not vibrate and the durability of the motor 32 is drastically improved.

In the above first through third embodiments, the power transmission shafts of the vibration motor and pulley shafts extend in a direction that is transverse to the direction of travel of the vehicle 15, as shown in FIG. 3. However, this is not intended as limiting in scope and also each of them can be installed in the same direction as the direction of travel of the vehicle 15.

Also, in the above first through third embodiments, a bed 6 is fixed on the floor 16 of vehicle 15. This is also intended not as limiting in scope and the base 6 may be fixed on the floor 16 slidably in back and forth directions.

Figure 12:
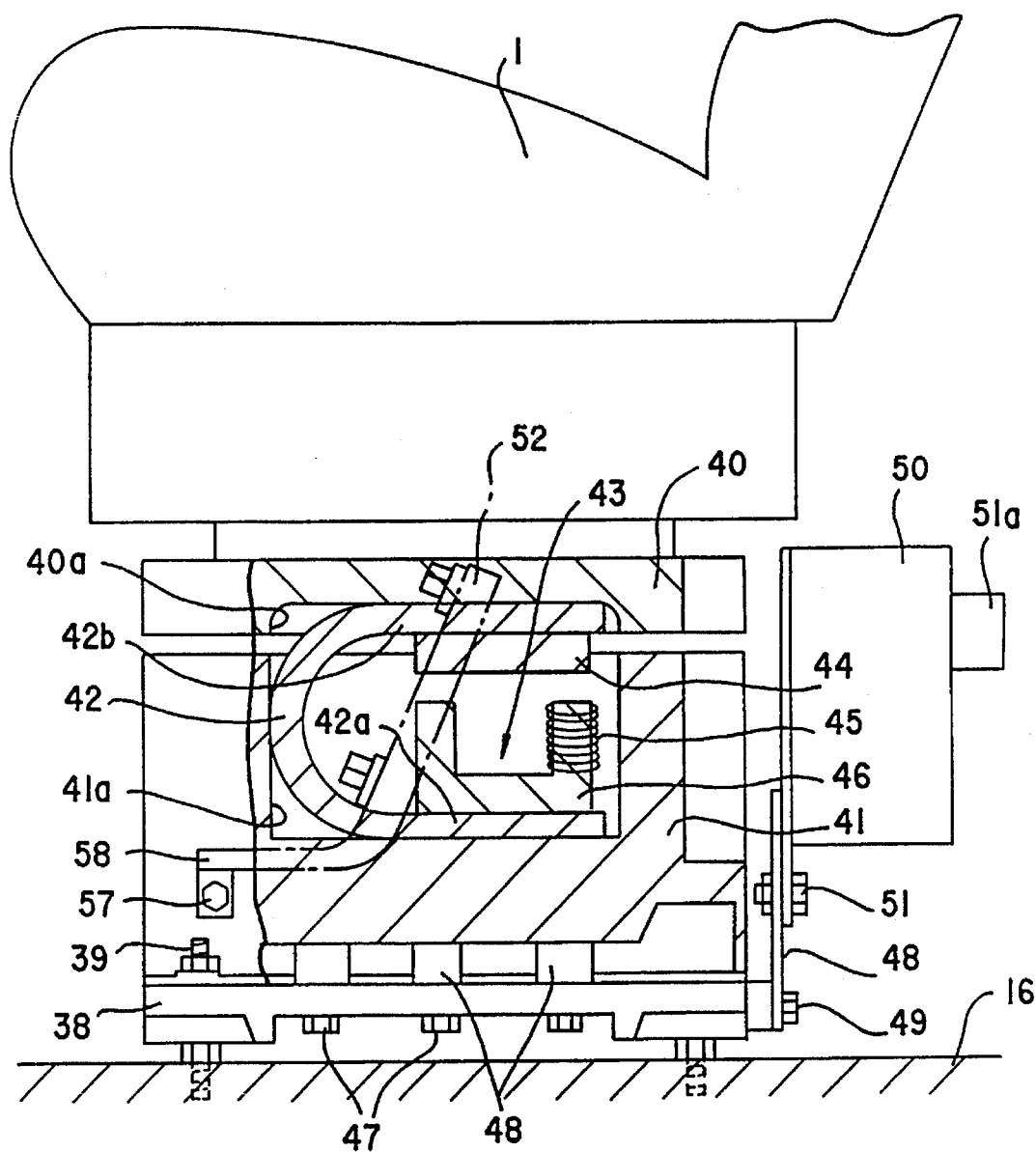
FIG. 12 is a side view, similar to FIG. 10 showing yet another embodiment.
Figure 13:
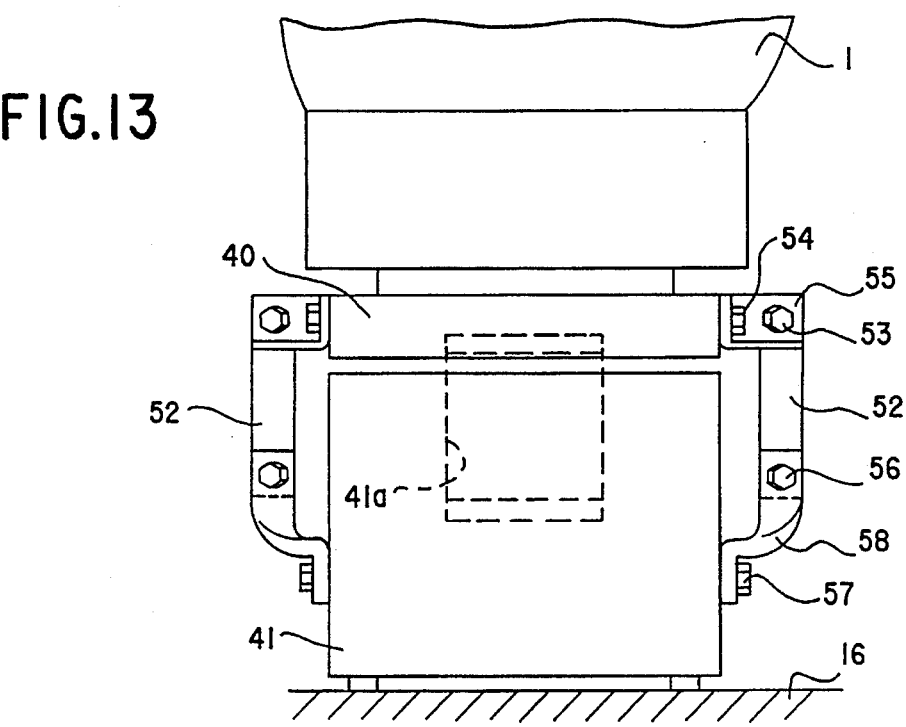
FIG. 13 is a rear view of the embodiment in FIG. 12.

FIGS. 12 and 13 show a fourth embodiment of the invention. In such fourth embodiment, a U-shaped flat spring 42 is installed between a driver's seat 1 and a base 38 and an electro-magnet 43 is connected to one of the ends 42*a* and 42*b* of the flat spring 42, while a permanent magnet 44 is connected to the other one of the ends 42*a* and 42*b*. Vibration of spring 42 is generated by sending electrical current into electro-magnet 43 and such vibration is transmitted to the driver's seat 1 so that the driver's seat 1 vibrates. In detail, an upper vibrating body 40 is fixed under the driver's seat 1 and a concave part 40*a* is formed in the middle on the underside of said vibrating body 40. Additionally, the lower vibrating body 41 is fixed on the upperside of the base 38 by bolts 47; and a rubber vibration insulator 48, which covers bolts 47, is fixed between the upperside of the base 38 and the underside of lower vibrating body 41. A concave part 41*a* is formed in the middle on the upperside of vibrating body 41. A U-shaped flat spring 42 is mounted between concave parts 40*a* and 41*a*. Height-adjustable bolt 39 is adjustable to fix the height of base 38 on the floor 16 of automobile 15, as shown in FIG. 3.

The underside of lower end 42*a* of flat spring 42 is welded to the bottom face of concave part 41*a* of lower vibrating body 41, while the upperside of upper end 42*b* of flat spring 42 is welded on the upper side of concave part 40*a* of upper vibrating body 40. An electro-magnet 43, having a fixed iron core 46 wound with coil 45, is fixed on the upperside of lower bar 42a of flat spring 42, while a moving iron core 44 is fixed on the underside of the upper bar 42b. Support board 48 is fixed on the side part of lower vibrating part 41 by a bolt 49. Controller 50 is fixed on support board 48 by a bolt 51. Controller 50 similarly contains an inverter, electric current adjustable handle 51a, or the like; and controlling alternating current supplied to coil 45 are installed on console panel set up in the rear side of controller 50.

As shown in FIG. 13, lower vibrating body 41 and upper vibrating body 40 are connected, at opposite right and left sides, by flat spring 52. Thus, the upper part of flat spring 52 is fixed on the upper stay 55 and fixed on said upper vibrating body 40 by bolts 54, while the lower part of flat spring 52 is fixed on the lower stay 58, fixed on the lower vibrating body 41 by bolts 57. In such a fixed state, flat spring 52 is tilted toward the rear, as shown in a chain line of FIG. 12, so that it works to set resonance frequency. In the third embodiment, 100 kgs. for a seat maximum load, 20 Hz for number of vibration frequency and 15 mm vibration for amplitude (i.e., vertical vibration of the driver's seat 1 such that its vibration is slightly tilted in a backward direction) are given to the driver's seat 1.

In the fourth embodiment, if a driver feels drowsiness coming on, the driver can turn on power-on switch and then operate an electric current adjustable handle 51a, installed on a console panel, so that suitable alternating current is sent to a coil 45 of electro-magnet 43. Because magnetic flux is generated on fixed iron core 46 of the electro-magnet 43, moving iron core 44 is attracted toward fixed iron core 46 and the rear part of upper vibration body 40 is tilted downward. When the alternating current becomes zero, the attracting force becomes zero and at the moving iron core 44 is returned to the original position by elastic stress of flat spring 42. In addition, both flat springs 42 installed between opposite sides of lower vibrating body 41 (left) and said upper vibrating body 40 (right) establish resonance frequency trailing the movement of upper vibration body 40. Thus, lower vibrating body 41 and upper vibrating body 40 vibrate vertically (in a direction tilted backward a little), and such vibration is transmitted, through upper vibrating body 40, to the driver's seat 1. A driver seated in the driver's seat 1 is kept alert by the vibration of the driver's seat and is not liable to doze off during driving.

Figure 14:
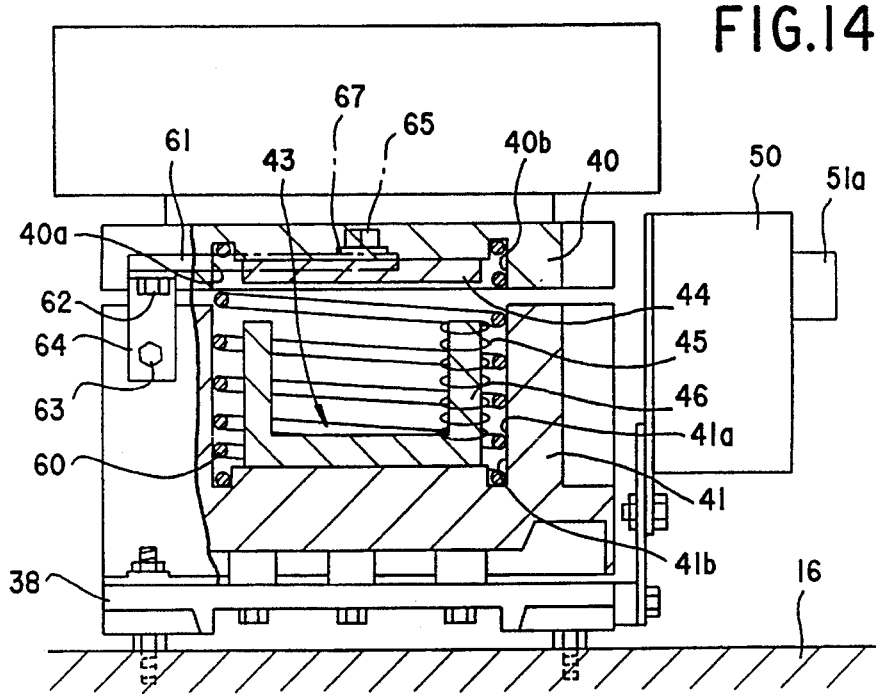
FIG. 14 is a side view, partly in section, of still yet another embodiment.
Figure 15:
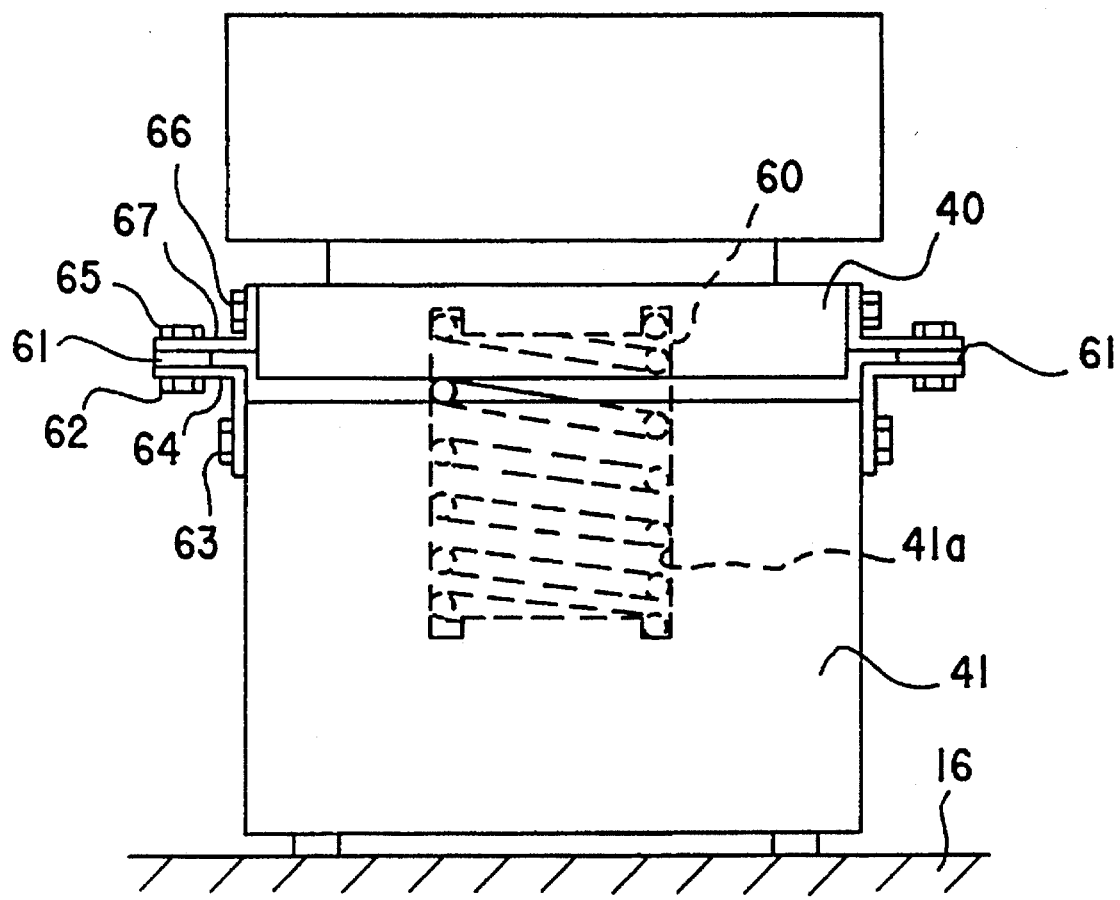
FIG. 15 is a rear view of the embodiment of FIG. 14.

FIGS. 14 and 15 show a fifth embodiment. In the fifth embodiment, a groove 41b is formed on the bottom face of the concave part 41a of lower vibration body 41 and the lower end of compression coil spring 60 is positioned in groove 41b and fixed. Groove 40b is formed on the upperside of the concave part 40a of upper vibration body 40, and the upper end of said compression coil spring 60 is positioned in groove 40b and fixed. Electro-magnet 43 is fixed on the bottom face of concave part 41a of lower vibration body 41 inside of compression coil spring 60. Moving iron core 44 is fixed n the upperside of the concave part 40a of the upper vibration body 40 inside the compression coil spring 60. As shown in FIG. 15, lower vibration body 41 and upper vibration body 40 are connected with flat spring 61 at its opposite right and left ends of body 41. One end of flat spring 61 is fixed by a bolt 62 on a lower stay 64 fixed on lower vibration body 41 by a bolt 63, while the other end is fixed by a bolt 65 on the upper stay 67, which is fixed on upper vibration body 40 by bolt 66. Flat spring 61, in such a fixed state and in a horizontal position, as shown by a chain line of FIG. 14, operates so as to set resonance frequency. Mainly in this fifth embodiment, a vertical vibration is provided to the driver's seat. The other parts, except for the above, are the same as those of the fourth embodiment and the same reference numbering is adopted.

In the above fourth and fifth embodiments, electro-magnet 43 is used for the lower vibration body 41 and a moving iron core 44 is used for the upper vibration body 40. This, however, is intended not as limiting in scope; and it is possible that electro-magnet 43 is used for the upper vibration body 40 and a moving iron core 44 can be used for the lower vibration body 41.

Figure 16:
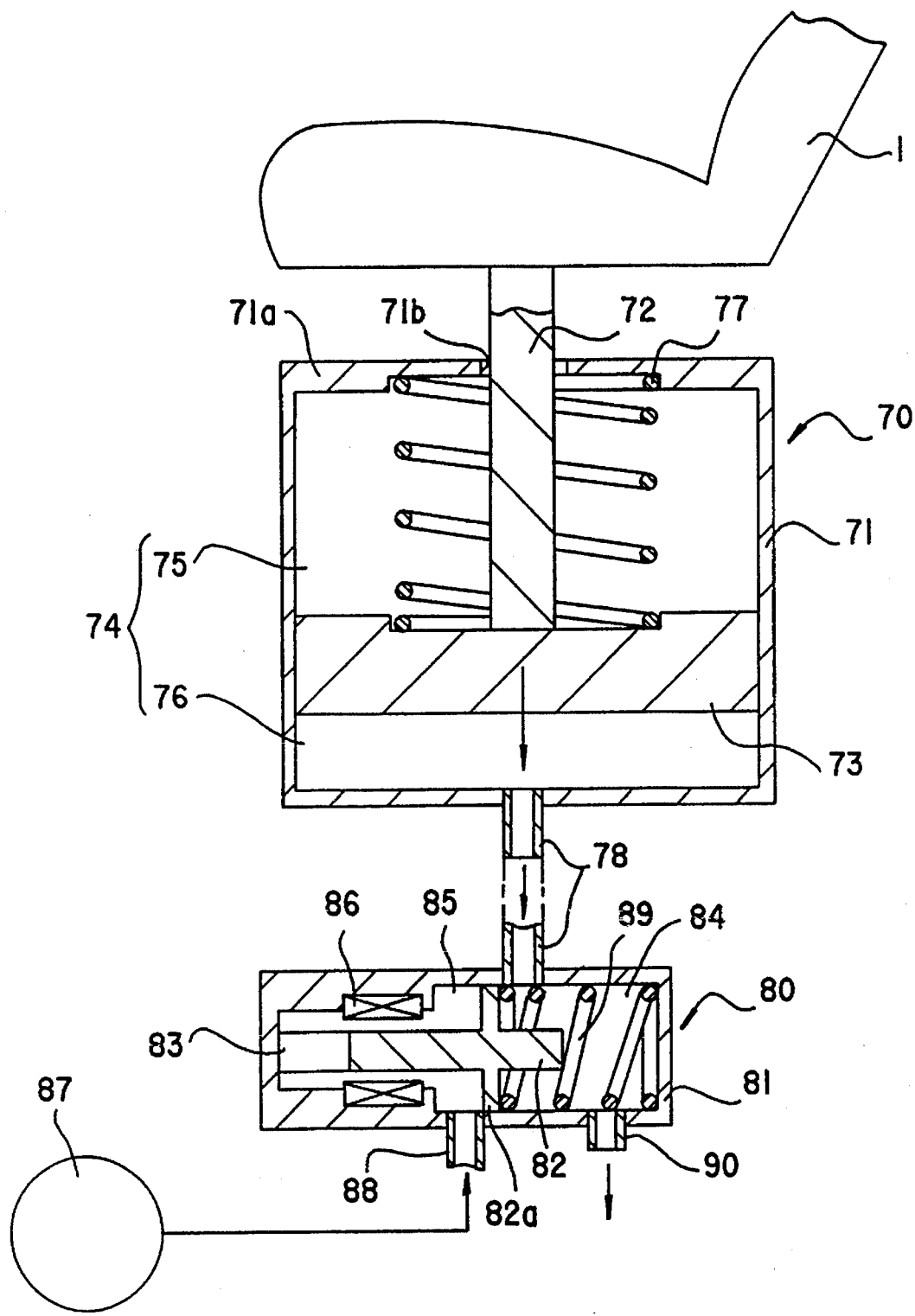
FIG. 16 is a side view, partly in section, of still a further embodiment, of the invention.

In the sixth embodiment of FIG. 16, a pneumatic cylinder vibrates driver's seat 1. A pneumatic cylinder 70, having an upper wall 71a, has a rod 72 passing through in rod hole 71b, formed on the middle part of an upperside 71a of cylinder body 71. The driver's seat 1 is fixed on the upper end of rod 72, while piston 73 is fixed on the lower end. Piston 73 is slidable, vertically, in cylinder 74, the piston dividing cylinder chamber 74 into an upper chamber 75 and a lower chamber 76. A spring 77 is arranged between the concave part of the upper side 71a of cylinder body 71 and the concave part of the upperside of the piston 73, and piston 73 is pressed downward by energy of spring 77. A line 78 is extended from lower chamber 76 and connected to a channel control valve 80.

In channel control valve 80, a valve rod 82 is slidably arranged inside a casing 81 and an iron core, or permanent magnet 83 is installed at the left end of the valve rod 82. A maximum diameter part 82a is formed in valve rod 82, dividing the casing 81 into two parts, a right chamber 84 and a left chamber 85. Electro-magnet 86 is fixed on a part of the housing of control valve 80 to the right from the left end by a definite distance on the chamber 85, while air-supply line 88, extended from a compressor 87, is connected to chamber 85. Spring 89 is positioned in right chamber 84 and valve rod 82 is pressed toward the left, FIG. 16, by energy of the spring 89. A passage 90 to atmosphere leads from right chamber 84 to the atmosphere outside.

Electro-magnet 86 is electrically connected, through an inverter, with a battery 17 of an automobile 15 such as in the fourth embodiment. Moreover, an on-off switch for vibration, which controls the supply of electricity to electromagnet 86, is arranged on a console panel of an automobile 15, FIG. 3. When the switch for vibration is pushed, the electro-magnet 86 is charged with alternating current.

In this embodiment, as shown in FIG. 16, in normal condition the vibration switch is not pushed and electromagnet 86 is not charged with electricity and magnetic force is not generated in the electro-magnet 86. The valve rod 82 is pushed to the left by elastic energy of spring 89 and contacts the leftside of a casing 81, wherein the maximum diameter part 82a of valve rod 82 is positioned between the connected line 78 and air supply line 88. Thereby, connected line 78 and passage to the atmosphere 90 are connected through the right chamber 84, while the communication of a line 78 and air supply line 88 are cut off by the maximum diameter part 82a. Therefore, the air of lower chamber 76 is connected to the atmosphere so that piston 73 is pressed downwardly toward a downside of the cylinder 71 by elastic energy of the spring 89; and the driver's seat 1 is supported by the upper wall 71a of cylinder body 71. In this case, the air from a compressor body 87 is released to the atmosphere outside by the compressor body 87, itself, or means for releasing air, which is arranged in the air supply line 88 (not shown).

Figure 17:
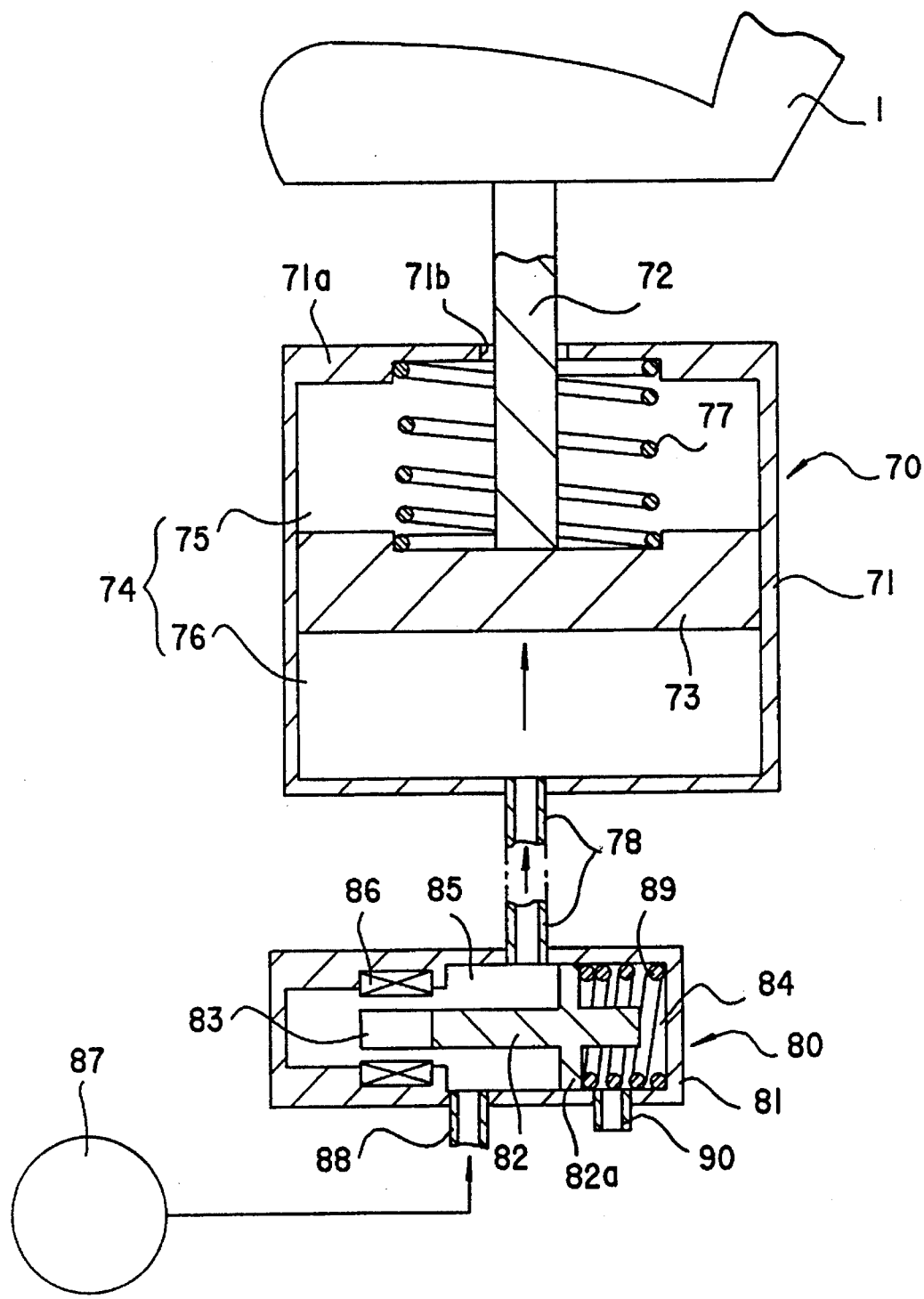
FIG. 17 is a side view, partly in section, of the embodiment of FIG. 16, with the apparatus in a different position.

When a driver feels drowsiness coming on during driving and the driver pushes on a switch for vibration, electromagnet 86 is not charged with alternating electricity. At that time, magnetic force is generated in said electro-magnet 86 intermittently in a short pitch, wherein iron core 83 is attracted toward the position where electro-magnet 86 is installed (i.e., toward the right, as shown in FIG. 16). Therefore, the valve rod 82 moves against elastic force of the spring 89, and, as shown in FIG. 17, the communication of the line 78 and the passage to atmosphere 90 is cut off by maximum diameter part 82a and line 78 and the passage to air supply line 88 are connected through chamber 85. Air, at air pressure of 3–5 kgs, is force-fed from compressor 87 into a lower chamber 76. Piston 73 (the area receiving the pressure is 20 cm$^2$) rises and the driver's seat 1 rises together. In the condition that magnetic force is not generated in electro-magnet 86, as mentioned above, because line 78 and the passage to atmosphere 90 are connected, the air in the lower chamber 76 is connected with the outside atmosphere, FIG. 16, the piston 73 is pressed downward by the energy of the spring 77 and also the driver's seat lowers. The above-described raising and lowering of the driver's seat 1 is repeated while the switch for vibration is pressed. In this way, if a driver feels drowsiness, the driver can vibrate the driver's seat 1 by repeating rise and fall of such driver's seat by operating the switch for vibration installed in the control panel 18. Therefore, the driver remains alert, does not doze off during driving, and traffic accidents caused by dozing during driving can be prevented.

Figure 18:
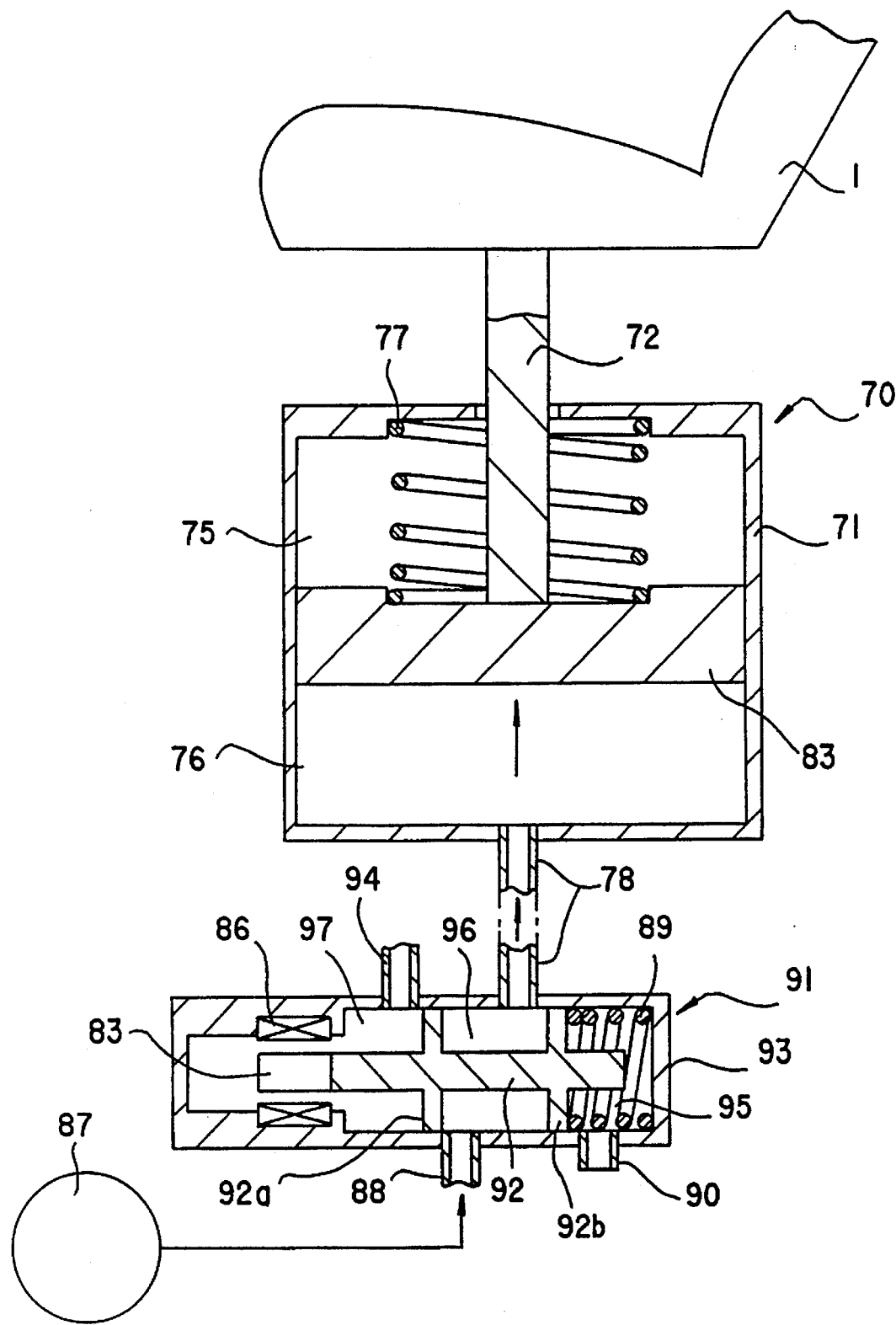
FIG. 18 is a side view, partly in section, of a further still embodiment, similar to FIG. 16; and, FIG. 19 is a side view of the apparatus of FIG. 18 with such apparatus in a different position.

In the seventh embodiment of the invention shown in FIG. 18, means for releasing air from compressor 87 into the atmosphere outside is installed in the channel control valve 91. This means that in the channel control valve 91 of this embodiment, as shown in FIG. 18, the maximum diameter parts of 92a and 92b of valve rod 92, are formed at the definite distance between them in the valve rod 92, whereby the casing 93 is divided, respectively, into a right chamber 95, a middle chamber 96 and a left chamber 97. Also, a line for releasing force feed air 94 is arranged in the casing 93, whose end opens to the outside of the automobile through a hole (not shown in Figures) formed in the floor 16 of the automobile 15, FIG. 3, into the atmosphere outside. The other parts, except for these parts, are the same as those of the above Example 6 and the same numbering is adopted.

Figure 19:
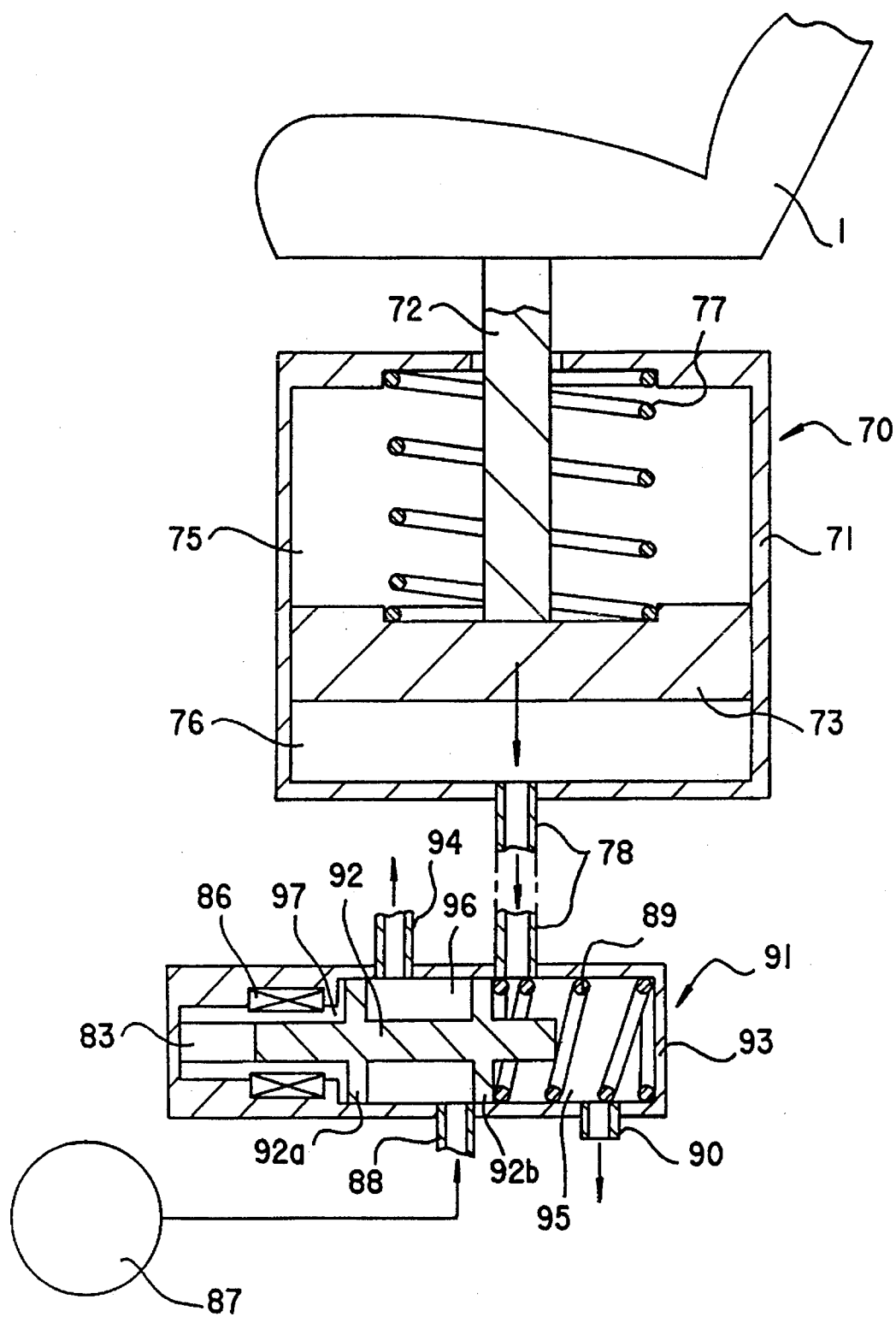

According to the seventh embodiment, the connected line 78 and the air supply line 88 are connected through the middle chamber 96 when magnetic force is generated in electro-magnet 86, as shown in FIG. 18. The connected line 78 and the line for the passage to the atmosphere 90 are connected through the right chamber 95, while the air supply line 88 and the line for releasing force feed air 94 are connected through the middle chamber 96 when magnetic force is not generated in electro-magnet 86, as shown in FIG. 19. Thus, when the compressor 87 is driving, the air pressed by compressor 87 is not sent to the lower chamber 76 of the cylinder chamber 74 so that the air can be discharged to the outside of the automobile.

In the embodiments, the combination of the valve rod 82 (92) combined with the spring 89 are adopted for the channel control valve 80 and 91. However, a rotary valve type is also acceptable.

Figure 20:
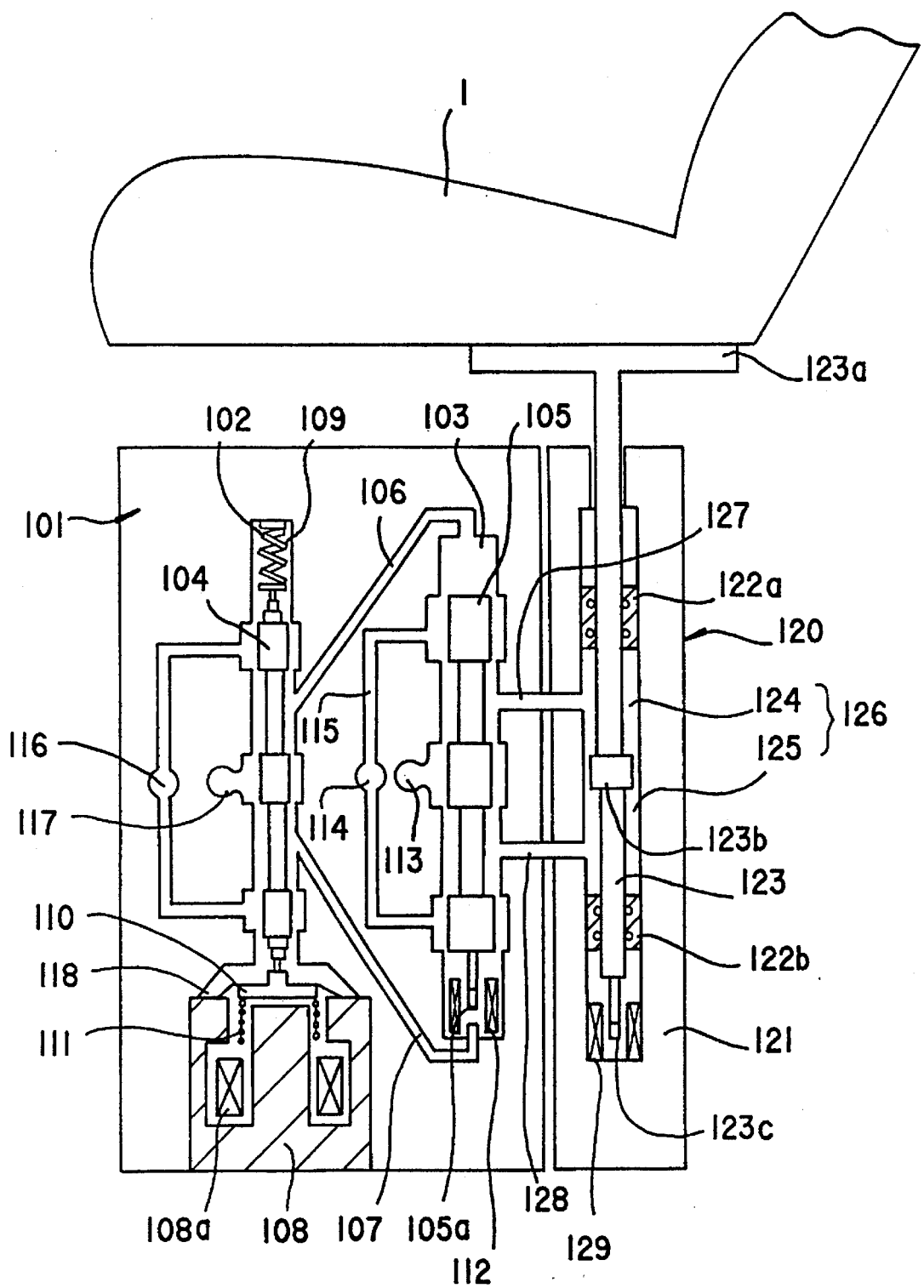
FIG. 20 is a side view, partly in section, of still another embodiment of the invention.

In the eighth embodiment of FIG. 20, the driver's seat 1 is vibrated by a hydraulic cylinder. More particularly, in hydraulic cylinder 120, a T-shaped piston rod 123 slides vertically. The driver's seat is fixed on a supporting part of the seat 123a formed at the upper end of piston rod 123. The cylinder chamber has a pressure chamber 126 formed between upper and lower hydraulic packings 122a and 122b, respectively. Pressured chamber 126 is divided into an upper pressure chamber 124 and a lower pressure chamber 125 by a maximum diameter part 123b formed on piston rod 123.

In servo valve 101, pilot stage 102 and power stage 103 are formed; and first valve rod 104 is arranged vertical-sliding-freely in the pilot stage 102, while the second valve rod 105 is arranged vertical-sliding-freely in the power stage 103. Pilot stage 102 is connected through fifth line 106 to an upper part of power stage 103, and through sixth line 107 to a lower part of power stage 103. Power stage 102 is connected through the first line 127 to an upper pressure chamber 124 of the cylinder chamber and through the second line 128 to a lower pressure chamber 125, through third line 113 to a hydraulic pump, not shown, and through fourth line 115 to first line for returning oil 114, respectively. A vibration generator, by dynamic electricity 108, is arranged under pilot stage 102. Coil 108a is positioned inside its vibration generator by dynamic electricity 108 while controlled body 110 is energized, upward, by a spring 109 in the upper part of the vibration generator 108. Coil 108a is, as in the fourth embodiment, electrically connected through an inverter with the battery 17 of the automobile 15, FIG. 3. Electricity supplied from the inverter to the coil 108a is converted into alternating current. An on-off switch, now shown, controls electric supply to coil 108a and is installed in the control panel 18, so that the controlled body 110 can be controlled vertical-sliding-freely by sending alternating current to coil 108a. Since controlled body 110 contacts first valve rod 104, the first valve rod 104 is energized upward. Additionally, first valve rod 104 is energized upward by an extension spring 111 fixed on the upper part of the pilot stage 102. The first displacement transducer 112, which detects a displacement in the lower part 105a of the second valve rod 105, is installed in the lower part of the power stage 103. The detection signal is sent to the vibration generator by dynamic electricity 108 as feedback. On the other hand, the second displacement transducer 129, which detects displacement in the lower part 123c of piston rod 123, is installed in the lower part of cylinder chamber 126. Such detection signal is sent to the vibration generator by dynamic electricity 108 as feedback. In FIG. 20, reference 116 is the second line for returning oil 117 is the seventh line connected with the hydraulic pump and 118 is a diaphragm, which are installed in the oil tight condition, on the controlled body 110 and the vibration generator by dynamic electricity 108.

Figure 21:
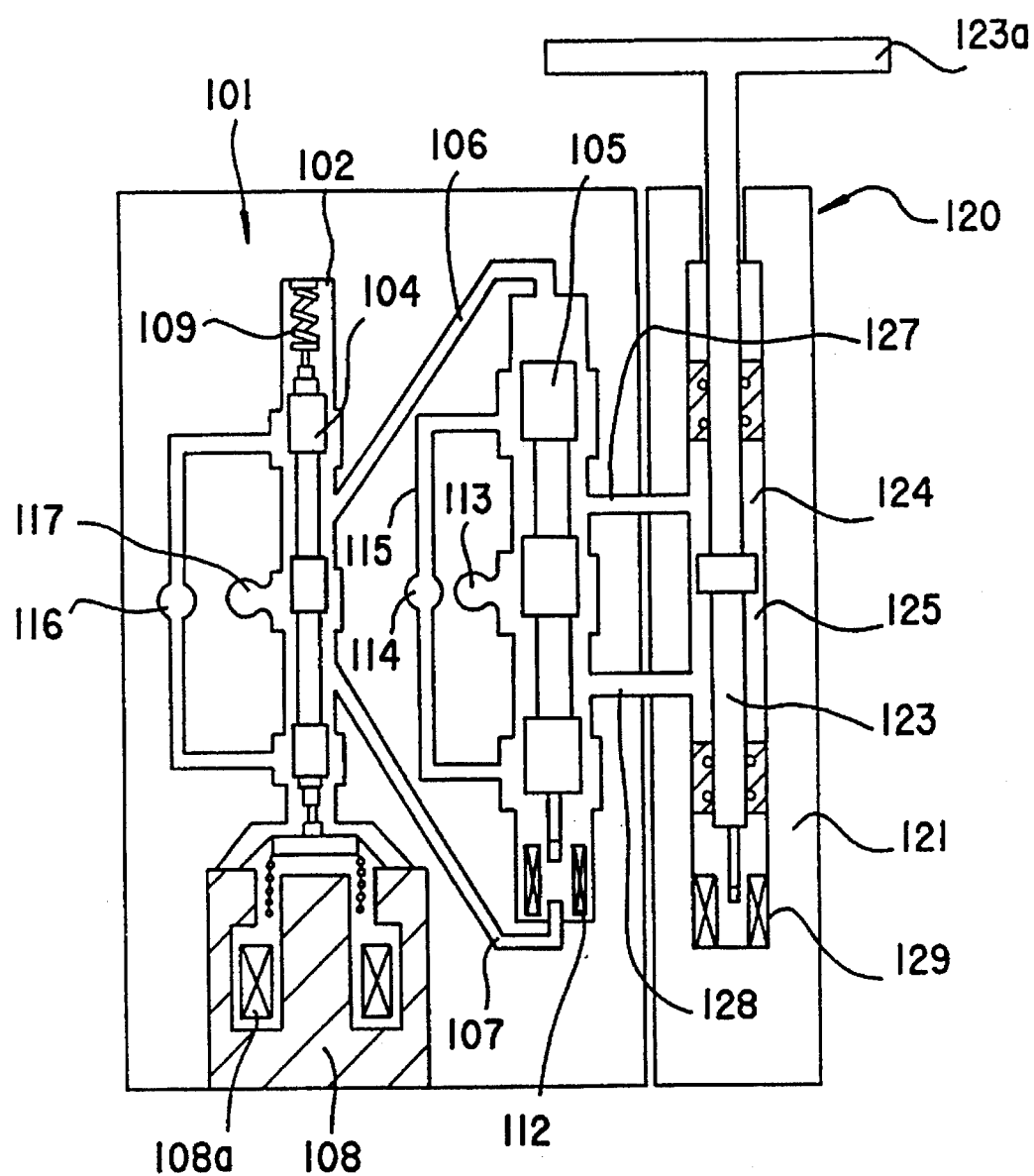
FIG. 21 is a side view, similar to FIG. 20, but with the apparatus in a different position.

In the above structure, when alternating current is sent to the coil 108a of the vibration generator by dynamic electricity 108 so that the controlled body is moved upward, as shown in FIG. 21, the first valve rod 104 moves upward and the seventh line 117 is connected with the sixth line 107 so that oil force fed by the hydraulic pump is supplied from the lower end of the power stage 103 to inside the power stage 103. At that time, the second line for returning oil 116 and the fifth line 106 are connected so that oil is returned from the upper end of the power stage 103 to tank (not shown in Figures). Accordingly, the second valve rod 105 moves upward and, as a result, the third line 113 is connected with the second line 128 so that the oil from the hydraulic pump is supplied to the lower pressure chamber 125. The first line for returning oil 114 and the first line 127 are connected through the fourth line 115 so that oil is returned from the pressure chamber 124 to the tank. Thus, piston rod 123 is moved upward and the driver's seat 1 rises. When the controlled body 110 is moved downward, in an opposite reaction against the above, the piston rod 123 is moved downward so that the driver's seat falls. Thus, in addition to the vertical movement of the controlled body 110, the driver's seat 1 vibrates. In this case, the amount of inflow oil and outflow oil to a lower pressure chamber 125 or an upper pressure chamber 124, changes by the displacement of the first valve rod 104 in the pilot stage 102, so that the piston rod 123 vibrates at a speed in proportion to the oil flow. The detection signals from the first displacement transducer 112 and the second displacement transducer 129 are sent to the vibration generator by dynamic electricity 108 as feedback, which enables precise control.

In the eighth embodiment, if a driver feels drowsiness coming on, the driver can operate switches installed on a control panel (such as, control panel 14 as shown in FIG. 6), whereby alternating current is sent into the coil 108a of vibration generator by dynamic electricity 108 so that a servo valve 101 operates to supply oil from the hydraulic pump to the pressure chambers 124 and 125 of the hydraulic cylinder 120 and the piston rod 123 moves vertically and the driver is kept alert and traffic accidents will be prevented.

Figure 22:
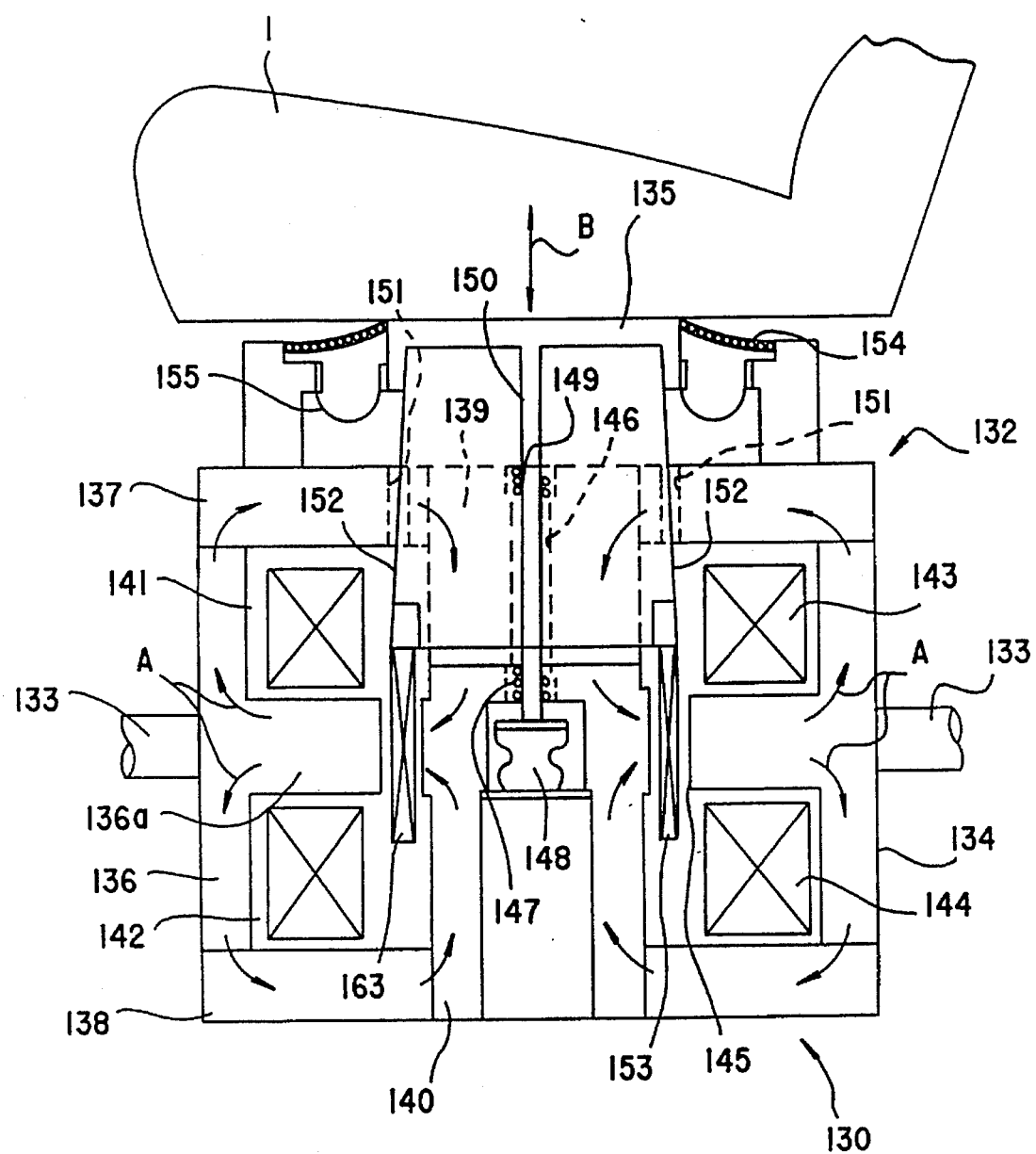
FIG. 22 is a side diagrammatic view, of a still further embodiment of the apparatus of the invention.

In the ninth embodiment in FIG. 22, the vibration generator 132, by dynamic electricity 130, is adapted to vibrate the driver's seat 1. In detail, support axes 133 of the vibration generator, by dynamic electricity 130, are extended from opposite sides in a horizontal direction, and supported by support base, not shown. And also, in the vibration generator by dynamic electricity 130, a base 135, wherein the driver's seat is fixed, is supported by iron core 134. The iron core 134 has an annular body magnetic pole 136, an annular upper yoke 137 fixed on an upper part of annular body magnetic pole 136, an annular lower yoke 138 fixed on a lower part of body magnetic pole 136, an annular upper center magnetic pole 139 and a lower center magnetic pole 140, arranged concentrically. Annular exciting coils 143 and 144 are arranged concentrically in two divided spaces of upper annular chamber 141 and lower annular chamber 142 formed thereby. Both exciting coils 143 and 144 are, like in embodiment four, electrically connected with the battery 17 of the automobile 15 so that the battery supplies direct current to both exciting coils 143 and 144.

An annular cavity 145, connecting the spaces of upper chamber 141 and lower chamber 142, is formed concentrically with exciting coils 143 and 144 in a central annular projecting portion 136a of body magnetic pole 136, while a bore 146 is formed through the center of upper center magnetic pole 139. Linear ball bearing 149 is fixed on the upper part of pit 146. Connecting holes 151, connecting with upper space 141, are formed at regular intervals in upper yoke 137. A hole of small diameter is formed on the upper portion of lower center magnetic pole 140, and a hole of larger diameter is formed under the hole of small diameter. Linear ball bearing 147 is fixed in the small diameter while air spring 148 is positioned in the hole of larger diameter.

Supporting rod 150, which extends downward from the center of the underside of base 135, passes through bore 146 of upper center magnetic pole 139 and the hole of small diameter of lower center magnetic pole 140 and is supported by air spring 148, for free vertical-sliding-movement by linear ball bearings 147 and 149. Connecting piece 152 extends downward through connecting hole 151 on the lower part of base 135, and is connected, through connecting hole 151, with annular driving coil 153. Driving coils 153, 163 are arranged in the cavity concentrically with concentric exciting coils 143 and 144, and 141 and 142, respectively. Driving coil 153 is electrically connected, through an inverter, with battery 17, whereby electricity, supplied to the driving coils 153, 163 is converted into alternating current. An off-off switch, not shown, controls the supply of electricity to driving coil 153 and is arranged in a control panel, such as control panel 14 as shown in FIG. 6. In FIG. 22, reference number 154 is an air seal and reference number 155 is a loop spring, which works as a baffle.

In the ninth embodiment, when the switch of the control panel is turned on, direct current is charged through exciting coils 143 and 144; and magnetic flux in the direction of arrow A is formed and alternating current is charged through the driving coil 153 at right angles to the magnetic flux of the direct current in coils 143, 144. According to Fleming's rule, an excitation force works in the B arrow directions, and the driver's seat vibrates. Therefore, if a driver feels drowsiness coming on, the driver can vibrate the driver's seat 1 by turning on the switch; thereby, preventing dozing of the driver during driving which subsequently prevents accidents from occurring.

In each of the above embodiments, the switch to turn on/off supply of electric current to vibration motor 10, electro-magnet 43, 86 or coil 108a, 153 is installed in operation panel (or control panel) so that the vibration motor 10 operates by turning on the switch if a driver feels drowsiness. This is not construed to limit the scope of this invention. For example, instead of said switch, a timer, installed in the operation panel (or control panel), is adoptable. In such a case, only if the timer is set up in starting off, the vibration motor 10 or the like operates when a certain time (for example, 10 minutes) has pass, while it also stops automatically when a certain time (for example, 5 minutes) has pass since it started to move. Such a timer is convenient in case that a person knows in advance from experience that he will feel drowsiness at a certain time (for example, 10 minutes) from starting to drive. In addition, instead of the timer for moving/stopping the vibration motor or the like, the switch for moving/stopping the vibration motor 10 or the like can be adoptable together with the timer so as to operate manually.

Thus, according to this invention, a driver's seat having a vibration generator connected to the driver's seat and controls for turning the vibration generator on and off for vibrating the driver's seat so that when a driver feels drowsiness coming on, the driver can operate the controls for switching on-off the vibration generator so that the driver's seat can be vibrated and the dozing of the driver during driving can be prevented. Accordingly, occurrence of accidents can be prevented.

While the invention has been particularly shown and described in reference to preferred embodiments thereof, it will be understood by those skilled in the art that changes in form and details may be made therein without departing from the spirit and scope of the invention.

What is claimed is:

1. An apparatus for vibrating a seat comprising:

a driver's seat;

means for vibrating said driver's seat; and means for controlling vibration of said means for vibrating the driver's seat, wherein means for vibrating said driver's seat includes an iron core installed under said driver's seat, a support body for supporting said driver's seat, an elastic body elastically supporting a lower end of said support body and installed on said iron core, annular spaces formed in upper and lower ends of said iron core, an annular exciting coil arranged concentrically in each of said annular spaces, a cavity in each of said exciting coils and connecting said annular spaces, at least an annular driving coil installed in a cavity for freely sliding vertically, a bore extending downward from the upperside of said iron core into an upper annular space of both annular spaces of said upper and lower ends of said iron core, a connecting piece in said bore and said upper annular space and connecting the upper part of said support body and said annular driving coil and means for supplying direct current to said exciting coils, and supplying alternating current to said annular driving coil so that said annular driving coil may be vertically vibrated.

* * * * *